United States Patent [19]

Ishino

[11] Patent Number: 5,173,521

[45] Date of Patent: Dec. 22, 1992

[54] ABSORBENT FIBROUS STRUCTURE AND PRODUCING METHOD THEREOF

[75] Inventor: Yoshiaki Ishino, Shizuoka, Japan

[73] Assignee: Mishima Paper Co., Ltd., Fuji, Japan

[21] Appl. No.: 715,199

[22] Filed: Jun. 14, 1991

[30] Foreign Application Priority Data

Jun. 19, 1990 [JP] Japan .................................. 2-160295

[51] Int. Cl.$^5$ ............................. C08J 3/07; C08J 5/18
[52] U.S. Cl. .................................... 524/45; 525/54.21
[58] Field of Search ........................ 524/45; 525/54.21

[56] References Cited

U.S. PATENT DOCUMENTS

| | | | |
|---|---|---|---|
| 3,589,364 | 6/1971 | Dean et al. ........................... | 604/368 |
| 4,252,761 | 2/1981 | Schoggen et al. ................... | 264/120 |
| 4,487,866 | 12/1984 | Almond et al. ....................... | 524/45 |
| 5,009,867 | 4/1991 | Kratochvil ........................... | 426/575 |

FOREIGN PATENT DOCUMENTS 54-5349  3/1979  Japan .
58-49779  4/1983  Japan .
1-163123  11/1989  Japan .

*Primary Examiner*—Nathan M. Nutter
*Assistant Examiner*—Jeffrey Culpeper Mullis
*Attorney, Agent, or Firm*—Lowe, Price, LeBlanc & Becker

[57] ABSTRACT

An absorbent fibrous structure comprising salts of fibrous carboxymethyl cellulose. In this structure, polyelectrolyte complexes are formed in at least a part of the salts of fibrous carboxymethyl cellulose by cationic water-soluble polymers. Each cationic water-soluble polymer comprises repeating units having at least one of primary, secondary, tertiary and quaternary nitrogen atoms and does not substantially have functional groups for forming cross-linking other than the nitrogen atoms. According to a preferred embodiment, polyamine resin was added to a suspension of Na-salts of fibrous CMC to prepare a stock, and from this stock, an absorbent fibrous sheet is produced by a paper-making method. Then, this sheet had a high water absorbency and had high wet tensile strength even after absorbing water. Further, slime was not generated at all and the sheet-surface was neutral.

10 Claims, No Drawings

ABSORBENT FIBROUS STRUCTURE AND PRODUCING METHOD THEREOF

BACKGROUND OF THE INVENTION

1. Field of the invention

This invention relates to an absorbent fibrous structure and producing method thereof. The absorbent fibrous structure is characterized by that it can keep its original shape after water is absorbed into it. Then, the inner surface of a food container is covered with the absorbent fibrous sheet in order to absorb juice, gravy, dew condensation and the like from the food. Also, the absorbent fibrous sheet can be used as a wrapping sheet with which vegetables and fruits are wrapped in order to keep their freshness by absorbing dew condensation from them. Further, this absorbent fibrous sheet can be used as a building sheet with which the ceiling and the wall of a building or the inner wall of a container is covered in order to absorb dew condensation from the building or the container. Alternatively, water is previously absorbed into absorbent fibrous sheet before food is wrapped with this sheet. In case that the food is wrapped with this sheet and heated in a micro-wave oven, vapor can be obtained from this absorbent fibrous sheet. In case that the food is fish or meat and is wrapped with this sheet so as to be kept, the freshness of the food can be maintained due to the water absorbed into the absorbent fibrous sheet. In the present invention, the absorbent fibrous structure is not limited to the sheet-structure and involves also other molded structures.

2. Description of the prior art

Fresh provision is packed in a film tray pack for commercial display. That is to say, the fresh provision is put on a tray made from polystyrene foam and covered with transparent film. However, since liquid such as blood and gravy from fish or meat deteriorates the appearance of the packed provision, some kinds of absorbent sheet capable of keeping their original shapes after absorbing the liquid are used to lay between the tray and the provision. Also in order to dehumidify boiled rice, the absorbent sheet is used. Further, in order to maintain freshness of some kinds of food, dew condensation from the food such as vegetables, fruits and the like should be absorbed into the absorbent sheet. Further, in order to absorb dew condensation generated in a room, a building, the absorbent sheet is used. In this case, this sheet is required to be suitable for interior work. One example of conventional absorbent sheets utilized in such situations is a water absorptive sheet, which is produced by coating water absorptive resin powders together with binder on a non-woven fabric or a plastic sheet. Another example of conventional absorbent sheets is a dry-laid non-woven fabric containing high absorptive fibers. However, these conventional absorbent sheets have disadvantages. For example; swelling gel particles are easily removed from the resin coated absorbent sheets. Then, since the binder obstructs absorbency, enough water cannot be absorbed into the water absorptive sheet. On the other hand, as for the dry-laid non-woven fabric, its utilization is limited due to its appearance; fabric.

Alternatively, several kinds of absorbent sheet for wrapping food have been disclosed. First, a laminated structure in the publication of Japanese Utility Model Application (Kokoku) No. 54-5349 is produced by laminating gas permeable-foamed substances comprising polyethylene with a sheet of cellulosic fibers. However, this laminated structure does not have high degree of water absorption and can not surely keep the absorbed water. Next, a laminated sheet in the publication of unexamined Japanese Utility Model Application (Kokai) No. 58-49779 is produced by laminating a water absorptive resin layer formed with cross-linked poly(-sodium acrylate) and the like with gas and liquid permeable layers, such as papers, fabrics or porous sheets. The resin layer is placed on one side of the permeable layer or between the permeable layers. However, when this laminated sheet is produced, adhesive is required for keeping and joining its structure. Therefore, it is not so easy to produce this structure. Thirdly, in the publication of unexamined Japanese Utility Model Application (Kokai) No. 1-163123, a water absorptive sheet is disclosed. This sheet is produced by putting porous protective sheets on the both sides of a non-woven absorbent sheet made of a fibrous water absorptive polymer, such as acrylonitrile-acrylate copolymer. That is to say, this sheet must be provided with the protective sheets comprising thermofusible fibers on its both sides. Therefore, film made from thermoplastic resin or non-woven fabric formed with thermoplastic resin-fibers as the protective sheet should be laminated with adhesive. Alternatively, the film or the fabric should be heated so as to be sticked together.

First, the above mentioned conventional absorbent sheets do not have enough water absorbency. Secondly, the conventional absorbent sheets must be provided with extra surface layers. Because, the sheets often must be prevented from contacting food directly, the water absorptive resin in the absorbing layer and the absorbing non-woven fabrics must be covered and the surfaces of the conventional absorbent sheets must be clear so that slime is not generated. Thirdly, the conventional absorbent sheets can not be applied to other molded structures. That is to say, only sheet-structure is used.

A following phenomenon has been known well. Multifunctional chemicals are added to water-soluble salts of fibrous carboxymethyl cellulose (Hereinafter, fibrous carboxymethyl cellulose is sometimes expressed by "fibrous CMC" as desired) so that cross-linking can be formed. Thus, the salts become insoluble in water and swollen gel is generated. As shown in U.S. Pat. No. 3,589,364, this phenomenon is applied to bibulous cellulosic fibers. However, since an absorbent fibrous sheet produced from these fibers does not have enough strength, this sheet can not be used actually for the above utilization as it is. Alternatively, the cross-linking is formed by adding multifunctional resin such as polyamide-polyamine epichlorohydrin resin to the fibrous CMC. Then, a paper-forming process is carried out for the fibrous CMC having cross-linking followed by a treatment in an alkaline solution so that water-soluble salts of the fibrous CMC can be formed. Then, an absorbent fibrous sheet having higher wet-web strength can be produced. However, the surface of this absorbent fibrous sheet is alkalized. Accordingly, when the sheet is contacted to food or a human body directly, this sheet would be unsuitable as it is. Further, the absorbed water is mainly taken into the swollen gel of the water-soluble salts of the fibrous CMC. Therefore, slime is generated on the surface. Also from this point, the surface layers are necessary.

SUMMARY OF THE INVENTION

It is an object of the present invention to provide an absorbent fibrous structure having high water absorption and enough wet-web strength.

It is another object of the present invention to provide a neutral absorbent fibrous structure.

It is yet another object of the present invention to provide an absorbent fibrous structure, which does not require any extra surface layer.

It is also another object of the present invention to provide an absorbent fibrous structure, which can be used not only as a sheet-structure but also as another molded structure.

The present invention features an absorbent fibrous structure comprising salts of fibrous carboxymethyl cellulose, wherein:

polyelectrolyte complexes are formed in at least a part of said salts of fibrous carboxymethyl cellulose by cationic water-soluble polymers, each of which comprises repeating units having at least one of primary, secondary, tertiary and quaternary nitrogen atoms and each of which does not substantially have functional groups for forming cross-linking other than said nitrogen atoms.

In the present invention, a nitrogen atom bonded with one carbon atom and two hydrogen atoms is expressed by a primary nitrogen atom. The primary nitrogen atom is commonly called an amino group or a primary amino group. A compound containing the primary nitrogen atom is a primary amine. Next, a nitrogen atom bonded with two carbon atoms and one hydrogen atom is expressed by a secondary nitrogen atom. Sometimes the secondary nitrogen atom is commonly called a secondary amino group. A compound containing the secondary nitrogen atom is a secondary amine. Then, a nitrogen atom bonded with three carbon atoms is expressed by a tertiary nitrogen atom. Sometimes the tertiary nitrogen atom is commonly called a tertiary amino group. A compound containing the tertiary nitrogen atom is a tertiary amine. Finally, a nitrogen atom bonded with four carbon atoms is expressed by a quaternary nitrogen atom. The quaternary nitrogen atom is bonded with anions by an ionic bond to form a quaternary ammonium salt.

The present invention further features a producing method of an absorbent fibrous structure comprising:

adding cationic water-soluble polymers, each of which comprises repeating units having at least one of primary, secondary, tertiary and quaternary nitrogen atoms and each of which does not substantially have functional groups for forming cross-linking other than said nitrogen atoms, to a suspension of salts of fibrous carboxymethyl cellulose in order to prepare a stock, in which polyelectrolyte complexes are formed in at least a part of said salts of fibrous carboxymethyl cellulose; and dehydrating said stock to form a shaped structure.

According to the present invention, the absorbent fibrous structure has following advantages; First, since this structure has high wet-web strength, enough water can be absorbed into it very quickly. Next, when the water is absorbed into this structure, this structure can keep its original shape. It is not necessary to provide a surface layer on the structure, because slime is not generated on the surface of the structure. Further, even if the structure is contacted to food directly, no extra surface layer is required, because its surface is neutral.

Moreover, this absorbent fibrous structure can be used not only as the sheet-structure but also as the other molded structure.

DETAILED DESCRIPTION OF THE INVENTION

It is well known that by multifunctional chemicals and multifunctional resin, cross-linking is formed in the salts of fibrous CMC. However, in the present invention, these chemicals and the resin are not used. Instead of them, cationic water-soluble polymers such as polyamine resin, poly(ethyleneimine), ionene polymer and other cationic polymers are used so that polyelectrolyte complexes can be formed in at least a part of the salts of the fibrous CMC.

The cationic water-soluble polymer (high molecular compound) has basic groups. Then, this polymer comprises repeating units (recurring units). Each repeating unit has at least one of primary, secondary, tertiary or quaternary nitrogen atoms. Chitosan is a natural polymer and one example of the cationic water-soluble polymers. As synthetic cationic water-soluble polymers, following two kinds of polymer can be mentioned.

(1) A polymer having at least one of primary, secondary, tertiary and quaternary nitrogen atoms at its side chains and (2) A polymer having at least one of primary, secondary, tertiary or quaternary nitrogen atoms at its principal chains.

The examples of the polymer (1) will be explained.

(1-a) A homopolymer formed from monomers having at least one of the primary, secondary, tertiary and quaternary nitrogen atoms. Further, the monomer has also groups having possibility of polymerization, other than the nitrogen atoms, such as a vinyl group. As the monomer, there can be mentioned N, N-dialkyl vinylamine, vinyltrialkyl ammonium, N-alkylaminoalkyl acrylate, N-alkylaminoalkyl methacrylate, N-alkylaminoalkyl acrylamide, N-alkylaminoalkyl methacrylamide, N, N-dialkylaminoalkyl acrylate, N, N-dialkylaminoalkyl methacrylate, N, N-dialkylaminoalkyl acrylamide, N, N-dialkylaminoalkyl methacrylamide, acryloyloxyalkyl trialkyl ammonium, methacryloyloxyalkyl trialkyl ammonium, acrylamidealkyl trialkyl ammonium, methacrylamidealkyl trialkyl ammonium, vinyloxyalkylamine, N-alkyl vinyloxyalkylamine, N, N-dialkyl vinyloxyalkylamine, N, N, N-trialkyl vinyloxyalkyl ammonium.

In the above monomers, number of carbon atoms of each alkyl group is from 1 to 4. Monomers having alkanol group instead of the alkyl group in the above monomers can be used. Further, monomers, in whcih alkoxy carbonyl alkylene group is introduced instead of the alkyl group attached to the nitrogen atom of a quaternary ammonium salt, can be used.

Poly(methacryloyloxyethyl trimethyl ammonium chloride) is an example of the above homopolymer (1-a).

Other examples of the polymer (1) having at least one of the primary, secondary, tertiary and quaternary nitrogen atoms at its side chains will be explained.

(1-b) A copolymer formed from two kinds of monomers that are capable to co-polymerize. The first monomers have at least one of the primary, secondary, tertiary and quaternary nitrogen atoms and groups having possibility of polymerization, other than the nitrogen atoms. That is to say, the first monomers are the same as the monomers explained in the homopolymer (1-a). The second monomers have groups having possibility of polymerization. Then, the first monomers and the second monomers form the copolymer (1-b). As the second monomers, there can be mentioned acrylamide, methacrylamide, acylonitrile, methacrylonitrile, alkyl acrylate, alkyl methacrylate, vinyl acetate, styrene, α-methylstyrene, 4-vinylpyridine, 2-vinylpyridine.

Poly(3-acrylamide-3-methylbutyl trimethyl ammonium chloride-CO-acrylamide) is an example of the above copolymer (1-b).

The other examples of the polymer (1) having at least one of the primary, secondary, tertiary and quaternary atoms at its side chains will be explained.

(1-c) A cationized polymer produced from homopolymers such as poly(acrylamide) by means of Mannich reaction or Hoffman rearrangement reaction.

The examples of the polymer (2) having at least one of the primary, secondary, tertiary and quaternary nitrogen atoms at its principal chains are (2-a) Ionene polymer, (2-b) Poly(ethyleneimine), (2-c) polyamine resin taken in a narrow sense, (2-d) Other condensation polymers.

The ionene polymer (2-a) is a polymer having ionic amino groups, in particular, quaternary ammonium groups at its principal chains. Most of its nitrogen atoms are quaternary atoms. Examples of the ionene polymer (2-a) will be explained.

(2-a-i) A polymer produced by polyaddition of dihalo compounds and ditertiaryamine. The dihalo compound has halogen atoms at its both ends and the ditertiaryamine has tertiary nitrogen atoms at its both ends. This ionene polymer is represented by a general formula (I):

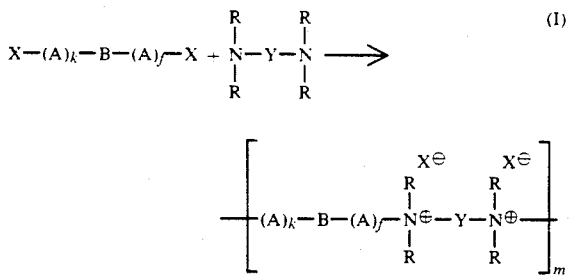

In the formula (I), R represents an alkyl group. In some cases, this alkyl group is provided with substitutional groups such as hydroxyl group, hydroxymethyl group, hydroxyethyl group and the like. The alkyl group has from 1 to 4 carbon atoms (the number of carbon atoms in the substitutional groups is not included). Then, Y represents an alkylene group or an arylenealkylene group such as ethylenephenethylene group. In some cases, the alkylene and arylenealkylene groups are provided with substitutional groups such as hydroxyl group, hydroxymethyl group, alkyl group having from 1 to 3 carbon atoms. The alkylene and arylenealkylene groups have from 1 to 10 carbon atoms respectively (the number of carbon atoms in the substitutional groups is not included). Further, X represents a halogen atom. A represents a methylene group. Alternatively, A represents a methylene group having substitutional groups such as hydroxyl group, hydroxymethyl group, alkyl group having from 1 to 3 carbon atoms and the like. Then, k, f represent integers of from 1 to 10.

Further, B represents one of divalent groups represented by following formulas:

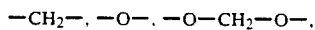

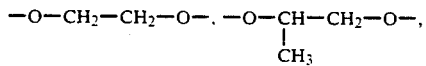

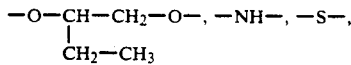

Phenylene Group

Finally, m represents a positive integer.

(2-a-ii) A polymer produced by polyaddition of precursor (tertiary amine having chlorine groups at its both ends) and ditertiaryamine. The precursor has possibility of polymerization. Then, 1 mole of the precursor is produced by ring-opening addition reaction of 2 moles of epichlorohydrin and 1 mole of primary amine. On the other hand, the ditertiaryamine has tertiary nitrogen atoms at its both ends. This polymer is represented by a general formula (II):

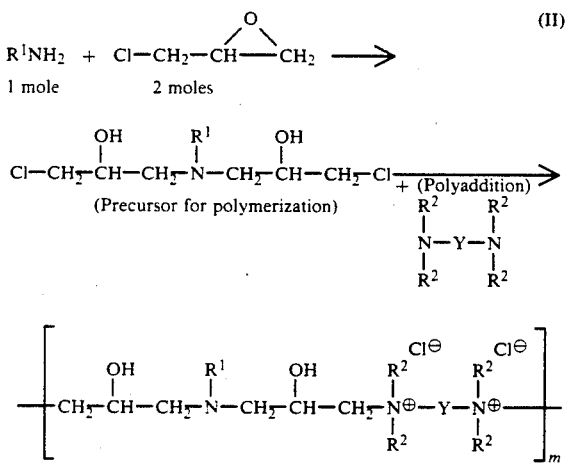

In the formula (II), $R^1$ represents an alkyl group. In some cases, this alkyl group is provided with substitutional groups such as hydroxyl group, hydroxymethyl group, hydroxyethyl group and the like. The alkyl group has from 1 to 20 carbon atoms (the number of carbon atoms in the substitutional groups is not included). Then, $R^2$ represents an alkyl group. In some cases, this alkyl group is provided with substitutional groups such as hydroxyl group, hydroxymethyl group, hydroxyethyl group and the like. The alkyl group has from 1 to 6 carbon atoms (the number of carbon atoms in the substitutional groups is not included). Further, Y represents an alkylene group or an arylenealkylene group such as ethylenephenethylene group. In some cases, the alkylene and arylenealkylene groups are provided with substitutional groups such as hydroxyl group, hydroxymethyl group, alkyl group having from 1 to 3 carbon atoms. The alkylene and arylenealkylene groups have from 1 to 10 carbon atoms respectively (the number of carbon atoms in the substitutional groups is not included). Finally, m represents a positive integer.

(2-a-iii) A polymer produced by polyaddition of compounds, each of which has a chlorine atom at its one end and a tertiary nitrogen atom at its other end. 1 mole of this compound is produced by ring-opening addition reaction of 1 mole of epichlorohydrin and 1 mole of secondary amine. This polymer is represented by a general formula (III):

(III)

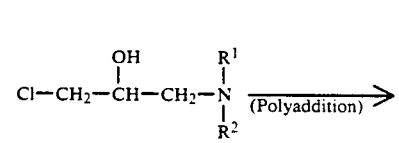

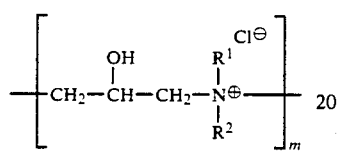

In the formula (III), $R^1$ and $R^2$ represent an alkyl group or an aralkyl group such as a phenethyl group respectively. In some cases, the alkyl and aralkyl groups are provided with substitutional groups such as hydroxyl group, hydroxymethyl group, hydroxyethyl group and the like. Then, the alkyl and aralkyl groups have from 1 to 10 carbon atoms (the number of carbon atoms in the substitutional groups is not included). It does not matter whether $R^1$ and $R^2$ are different groups or the same groups. Finally, m represents an positive integer.

The poly(ethyleneimine) (2-b) is a polymer produced by ring-opening polymerization of ethyleneimine. It has primary, secondary and tertiary nitrogen atoms on its principal and branched chains.

The technical definition of the polyamine resin (2-c) is not established. However, in the narrow sense, it is defined that, for example, the resin has primary, secondary, tertiary and quaternary nitrogen atoms and the number of the quaternary nitrogen atoms is less than the half of the number of the whole nitrogen atoms. Therefore, the resin differs from the above mentioned ionenepolymer in that the number of the quaternary nitrogen atoms in the resin is small. The examples of the resin will be explained (2-c-i) A polyamine produced by condensation polymerization of compounds, 1 mole of which is produced by ring-opening addition reaction of 1 mole of epichlorohydrin and 1 mole of primary amine. During the condensation polymerization, the formation of quaternary nitrogen atom is controlled. The polyamine is represented by a general formula (IV):

The polyamine is acidified to be a hydrochloride represented by a general formula (V):

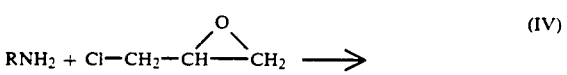
(IV)

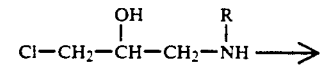

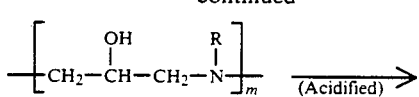
(Condensation polymerization while controlling the formation of the quaternary nitrogen atoms)

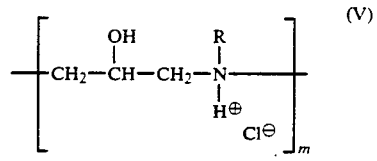
(V)

In these formulas (IV), (V), R represents an alkyl group. In some cases, the alkyl group is provided with substitutional groups such as hydroxyl group, hydroxymethyl group, hydroxyethyl group and the like. Then, the alkyl group has from 1 to 20 carbon atoms (the number of carbon atoms in the substitutional groups is not included). Finally, m represents a positive integer.

(2-c-ii) A condensation polymer formed from alkylenediamine and epichlorohydrin to be represented by a general formula (VI):

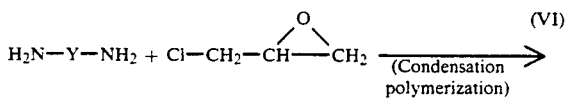
(VI)

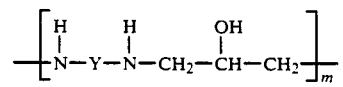

In the formula (VI), Y represents an alkylene group. In some cases, the alkylene group is provided with substitutional groups such as hydroxyl group, hydroxymethyl group, hydroxyethyl group and the like. Then, the alkylene group has from 1 to 10 carbon atoms (the number of carbon atoms in the substitutional groups is not included). Finally, m represents a positive integer.

(2-c-iii) A condensation polymer formed from alkylenediamine and alkylene dihalide to be represented by a general formula (VII):

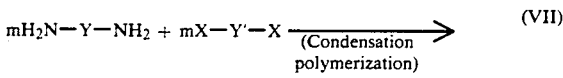
(VII)

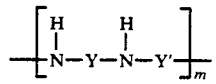

In the formula (VII), Y and Y' represent alkylene groups respectively. In some cases, the alkylene group is provided with substitutional groups such as hydroxyl group, hydroxymethyl group, hydroxyethyl group and the like. Then, the alkylene group has from 1 to 10 carbon atoms (the number of carbon atoms in the substitutional groups is not included). Finally, m represents a positive integer.

(2-d) As the other condensation polymers, following two kinds of polymer can be mentioned (2-d-i) A polyamine-polyamide produced by condensation polymerization of alkylenepolyamine and dicarboxylic acid, for example, a condensation polymerization of diethylenetriamine and adipic acid.

(2-d-ii) A polymer produced by following method. Epichlorohydrin and dimethylamine are added to the above mentioned polyamine-polyamide explained in (2-d-i). Thus, the chlorine of the epichlorohydrin is added to a part of amide group of the polyamine-polyamide so that the polymer becomes a quaternary polymer. At the same time, ring-opening addition reaction of the epichlorohydrin and the dimethylamine is carried out. Therefore, this quaternary polymer has secondary, tertiary and quaternary nitrogen atoms at its principal chains and tertiary nitrogen atoms at its side chains.

Further, for the above mentioned chitosan, homopolymers, copolymers, chemically modified polymers and the like, their primary, secondary and tertiary nitrogen atoms are modified to quaternary nitrogen atoms by means of an agent to form quaternary nitrogen atoms. The resultant quaternary polymers also can be used as the cationic water-soluble polymers according to the present invention.

By means of this agent, the alkyl group or alkoxy carbonyl alkylene group can be introduced to the primary, secondary and tertiary nitrogen atoms. As the agent, there can be mentioned an alkyl halide (methyl chloride, ethyl chloride, methyl bromide and the like), dimethyl sulfate, methyl chloroacetate and the like. Before polymerization, this agent can be used for the monomers in order to form the quaternary nitrogen atoms. Alternatively, after the polymerization, this agent can be used for the repeating units in the polymer.

In the present invention, the cationic water-soluble polymer has the primary, secondary, tertiary or quaternary nitrogen atoms, but does not substantially have other active functional groups such as glycidyl group, aldehyde group, carboxyl group, vinyl group, allyl group, N-methylol group, thiol group, isocyanate, isothiocyanate. Because, the cationic water-soluble polymer is designed so as not to form the cross-linking and the like except the case that the polyelectrolyte complexes are formed in the fibrous CMC. In the above explanation, meaning of the terms "the polymer does not substantially have . . . " will be explained concretely. If the cross-linking was formed with covalent bond in the above mentioned active functional groups, forming of the polyelectrolyte complexes would be disturbed or decreased thereby slime would be produced on the absorbent fibrous structure in a swollen form. However, in the present invention, there are very few active functional groups other than the above mentioned nitrogen atoms, if any. Therefore, the polyelectrolyte complexes can be formed without disturbance and slime is not produced on the absorbent fibrous structure in a swollen form.

The cationic equivalent (Hereinafter cationic equivalent is expressed by "ca.".) of the cationic water-soluble polymer is from 0.1 to 20 milliequivalent/g, preferably from 1 to 15 milliequivalent/g, more preferably from 2 to 10 milliequivalent/g on the condition of pH value of from 3 to 9. Then, the mean molecular weight of the polymer is from 5000 to 100000, preferably, from 5000 to 70000, more preferably, from 5000 to 20000.

As the salt of the fibrous CMC, there can be mentioned lithium salt, sodium salt, potassium salt, calcium salt, magnesium salt, ammonium salt or amine salt such as methylamine, ethanolamine and the like. The degree of substitution of the fibrous CMC is 0.1 to 1.0, preferably 0.3 to 0.8, more preferably 0.4 to 0.6. The degree of base saturation, which means the ratio of carboxyl groups changed to salts, is 50 to 100%, preferably 80 to 100%, more preferably 90 to 95%.

The cationic water-soluble polymers are added to the salts of the fibrous CMC. The mixing ratio of the water-soluble polymer is, as cationic equivalents of the polymer, from 0.1 to 100% of anion equivalents of the fibrous CMC. Then, the ratio can be selected from them according to the kind of cationic water-soluble polymer. By addition of the cationic water-soluble polymer, the polyelectrolyte complexes are formed in the salts of the fibrous CMC. It is understood that the polyelectrolyte complexes are formed by means of Coulomb's force between the salts of the fibrous CMC and the cationic water-soluble polymer, because their electric charges are opposite each other. The structure of this complex can not be explained exactly. However, it seems that ionic cross-linking is formed between the moleculars of the fibrous CMC by the cationic water-soluble polymers. Alternatively, it seems that the cationic water-soluble polymers stand close together the molecular chain of the fibrous CMC.

The absorbent fibrous structure according to the present invention is produced as follows. First, suspension of the salts of the fibrous carboxymethyl cellulose is prepared. Then, the cationic water-soluble polymers are added. The cationic water-soluble polymer has at least one kind of the primary, secondary, tertiary and quaternary nitrogen atoms. Further, the cationic water-soluble polymer does not substantially have functional groups, by which cross-linking is formed, other than the above mentioned nitrogen atoms. Thus, by the addition of the cationic water-soluble polymers to the suspension, a stock is obtained. In this stock, the polyelectrolyte complexes are formed in at least a part of the salts of the fibrous carboxymethyl cellulose. Finally, by dehydration for the stock, a shaped structure can be formed.

There are several methods for producing the shaped structure in the present invention. First, the producing methods for the sheet-structure will be explained. For the stock prepared above, paper making and drying are carried out by use of usual paper making technique so that the absorbent fibrous structure of a sheet-structure can be formed. Secondly, in order to form another molded structure, there can be molding methods. For example, a convex wire netting for molding is immersed in the stock prepared above. Then, the inside pressure of the wire netting is reduced so that fibers are accumulated on the wire netting. Then, after pressing and drying, the wire netting is removed, thus the absorbent fibrous structure of the molded structure can be formed. By using wire nettings designed to mold prescribed shapes, various kinds of absorbent fibrous molded structure can be obtained.

In producing the absorbent fibrous structure, in addition to the above mentioned substances, wood pulp, non-wood pulp, dissolving pulp, semisynthetic fiber for paper making, synthetic fiber for paper making, inorganic fiber for paper making and the like can be mixed. The mixing ratio is preferably less than 50%, more preferably less than 25%. Further, small amount of chemicals for increasing wet-web strength of the absorbent fibrous structure can be added.

As stated above, the cationic water-soluble polymer does not substantially have functional groups, by which the cross-linking is formed, other than the primary, secondary, tertiary or quaternary nitrogen atoms. By the cationic water-soluble polymer, the polyelectrolyte complexes are formed in at least the part of the salts of the fibrous CMC. Then, the absorbent fibrous structure has enough wet-web strength. It is understood because the fibrous CMC are linked each other through the cationic water-soluble polymer. As for the linking of the fibrous CMC, for example, COO− groups of the fibrous CMC are bonded with the quaternary nitrogen atoms of the cationic water-soluble polymer by ionic bond. Alternatively, the COO− groups and the primary or secondary nitrogen atoms (the primary or secondary amino groups) are reacted. Then, dehydration is carried out in a drying step so that amides are formed. Further, in case that the COOH groups are remained after the polyelectrolyte complexes are formed, the COOH groups are dehydrated in the drying step so as to be acid anhydrides.

Accordingly, while the salts of the fibrous CMC keep their fiber-structure, the salts are swollen and gelled. Therefore, enough water is supported in a lot of pores formed among fibers.

If cationic polymers having the other active functional groups such as glycidyl group were used, crosslinking would be produced by covalent bond between the fibrous CMC. In this case, forming of the polyelectrolyte complexes would be disturbed, thus, water would be mainly absorbed into the swollen gel of the salts of the fibrous CMC. The water absorbed into the swollen gel of the salts of the fibrous CMC can not be discharged by external force. Accordingly, if too much water is absorbed, the slime is often generated. However, in the present invention, the water is absorbed also into the pores among fibers in the same manner of water absorbed into porous spongy-structure. Then, the water in the pores among fibers can be discharged easily by external force. Therefore, in the present invention, although the absorbent fibrous structure can absorb the water being 7-15 times heavy as itself, the slime is not generated. Thus, an extra surface layer against the slime is not necessary. That is to say, the absorbent fibrous structure can be used as the sheet-structure without the extra surface layer. Further, the absorbent fibrous structure can be molded to be other molded structures. Moreover, in the present invention, since the water can be discharged by the external force, the absorbent fibrous structure can be used repeatedly if desired. In the present invention, alkaline coating is not carried out at the end of the producing steps for the absorbent fibrous structure. Thus, as for pH value of the absorbent fibrous structure, it is neutral. Therefore, for applying the absorbent fibrous structure, if it is contacted directly with food or a human body, there is not any problem.

In the present invention, it is needless to say that a single sheet-structure can be produced with a paper machine from the stock of absorbent fibrous structure. Alternatively, multiple wet-webs can be produced with multicylinder paper machines from the same stock of the absorbent fibrous structure. Then, the multiple wet-webs are combined so as to be a sheet having a high basis weight. Further, multiple wet-webs are produced respectively from different kinds of stock of absorbent fibrous structure so as to be combined for obtaining a multiple layer paper. Alternatively, the wet-web produced from the absorbent fibrous structure can be laminated with synthetic resin film. In this case, several kinds of laminated structure can be produced.

The invention will hereinafter be described by the following examples.

In each example, water absorption degree, wet tensile strength, slime degree in wetting and pH value of the sample-surface are evaluated respectively as follows.

Water Absorption Degree

First, a test piece (its size is 10 cm in width 12 cm in length) was immersed in 1000 ml of aqueduct water for 30 minutes. Next, the test piece was pulled up from the aqueduct water and hung from its one end for 1 minute so that excess water could fall. Then, the weight of the test piece was measured. The water absorption degree is expressed by a following equation:

the water absorption degree (g/g)=[{the weight of the test piece after the excess water is removed (g)}−{the air-dried weight of the test piece (g)}]÷[the air-dried weight of the test piece (g)]

Wet Tensile Strength

First, a test piece (its size is 15 mm in width 200 mm in length) was immersed in aqueduct water (its temperature is 20° C.) for 30 minutes. Next, the test piece was pulled up from the aqueduct water and excess water was removed by a filter paper. Then, the wet tensile strength was measured with a Schopper tensile strength tester.

Slime Degree in Wetting

First, a test piece (its size is 10 cm in width 12 cm in length) was immersed in 1000 ml of aqueduct water for 3 minutes. Next, the test piece was pulled up from the aqueduct water. Then, the touch of its surface was evaluated by a sensory test.

pH Value of the Sample-Surface

The solution of pH-indicator was coated on a test piece. Then, coloration is examined by using a standard.

EXAMPLE 1

Na-salts of fibrous CMC (manufactured by Nichirin Chemical Industries, Ltd., Japan, the degree of substitution (D. S.): 0.43, the degree of base saturation: 90%) were dispersed in water in order to prepare a suspension having the concentration of 1.5%. Polyamine resin (Sumiraze Resin FR-2P, trade name of product manufactured by Sumitomo Chemical Ind. Ltd., Japan, having quaternary and tertiary nitrogen atoms, mean molecular weight: 10000, ca.: 5.8 milli equivalents/g on the condition of pH value of 6, hereinafter expressed by "FR-2P" throughout all examples) was added to the above suspension to be stirred at the mixing rate of 2.0 weight % for the Na-salts of the fibrous CMC, so that a stock could be prepared. Then, from the stock, an absorbent fibrous sheet having the basis weight of 70 g/m² was produced with a cylinder paper machine.

As for the resultant absorbent fibrous sheet, the water absorption degree, the wet tensile strength, the slime degree in wetting were evaluated respectively. Then, the result for the absorbent fibrous sheet is shown in Table 1. On the other hand, for a tissue paper, the same conditions were evaluated. Then, also the result for the tissue paper is shown in Table 1 in order to compare this absorbent fibrous sheet with the tissue paper.

As shown in Table 1, the sheet obtained in Example 1 could absorb aqueduct water being 12 times as heavy as itself. Even after absorbing water, the sheet had high wet tensile strength so as to keep its sheet-structure. The fibrous CMC in the sheet absorbing water had high gel strength and flexibility. Accordingly, the sheet had flexibility, and the slime was not generated at all. The pH value of the sheet-surface was 6 to 7; it was neutral.

Next, two disposable lunch boxes were prepared. Each box was made from polystyrene foam and consisted from a vessel and a lid. Hot melt type pressure-sensitive adhesive (Topco P618A, trade name of product manufactured by Toyo Petrolite Co., Ltd., Japan) was pasted on the inner surface of the lid of one box. Next, the above mentioned absorbent fibrous sheet was sticked on the inner surface of this lid. Then, each lunch box was filled with 300 g of rice just after it was cooked. Next, the lunch boxes are covered respectively, while one box is covered with the lid having the absorbent fibrous sheet and the other box is covered with the original lid without the absorbent fibrous sheet. The lunch boxes containing rice were left for 4 hours. Finally, the lids were removed and the conditions of the rice were observed respectively. The rice covered with the lid having the absorbent fibrous sheet had an appropriate moisture content as a cooked rice. Because, dew condensation from the rice was absorbed into the absorbent fibrous sheet. Accordingly, the rice did not become watery. On the other hand, the rice covered with the orginal lid become watery, because, the dew condensation was absorbed into the rice. Thus, the value of the rice was lowered extremely.

Therefore, since the dew condensation of the vapor can be absorbed into the absorbent fibrous sheet of the present invention, it is clear that the absorbent fibrous sheet prevent the dew condensation from attaching to food such as rice and the absorbent fibrous sheet is suitable to be used as packages and wrappings for many kinds of food.

EXAMPLE 2

Na-salts of fibrous CMC (manufactured by Nichirin Chemical Industries, Ltd., Japan, the degree of substitution: 0.43, the degree of base saturation: 100%) were dispersed in water in order to prepare a suspension having the concentration of 1.5%. Poly(ethyleneimine) resin (Epomin SP 200, trade name of product manufactured by Nippon Shokubai Kagaku Kogyo Co., Ltd., Japan, consisting of a branch-structure and provided with primary, secondary and tertiary nitrogen atoms, mean molecular weight: 20000) was added to the above suspension to be stirred at the mixing rate of 1.0 weight % for the Na-salts of the fibrous CMC, so that a stock could be prepared. Then, from the stock, a hand-made sheet having the basis weight of 60 g/m$^2$ was produced according to JIS P8209.

As for the resultant absorbent fibrous hand-made sheet, the water absorption degree, the wet tensile strength, the slime degree in wetting were evaluated respectively. Then, the result is shown in Table 1.

As shown in Table 1, the sheet obtained in Example 2 could absorb aqueduct water being 13 times as heavy as itself. Even after absorbing water, the sheet had high wet tensile strength so as to keep its sheet-structure. Since the fibrous CMC in the sheet absorbing water had a high gel strength, the slime was not generated at all. The pH value of the sheet-surface was 6 to 8. That is to say, the absorbent fibrous sheet obtained in Example 2 is similar to the sheet obtained in Example 1.

EXAMPLE 3

Na-salts of fibrous CMC (manufactured by Nichirin Chemical Industries, Ltd., Japan, the degree of substitution: 0.43, the degree of base saturation: 95%) were dispersed in water in order to prepare a suspension having the concentration of 1.5%. Polyamine resin (FR-2P) was added to the above suspension to be stirred at the mixing rate of 2.0 weight % for the Na-salts of the fibrous CMC in order to prepare the first stock. On the other hand, dissolving pulp (manufactured by Sanyo-Kokusaku Pulp Co., Ltd., Japan) is defiberized to be the second stock having the concentration of 1.5%. Then, the first and second stocks were mixed so as to produce a paper-stock. The mixing ratio by weight of the first and second stocks was 80 weight % and 20 weight %. Then, from this paper-stock, a sheet having the basis weight of 30 g/m$^2$ was produced with a cylinder paper machine.

As for the resultant absorbent fibrous sheet, the water absorption degree, the wet tensile strength, the slime degree in wetting were evaluated respectively. Then, the result is shown in Table 1.

As shown in Table 1, the sheet obtained in Example 3 could absorb aqueduct water being 10 times as heavy as itself. Even after absorbing water, the sheet had high wet tensile strength so as to keep its sheet-structure. The fibrous CMC in the sheet absorbing water had high gel strength and flexibility. Accordingly, the sheet had also flexibility, and the slime was not generated at all. The pH value of the sheet-surface was 6 to 7; neutral.

Resin having high water absorbency (Aquakeep 10SH, trade name of product manufactured by Sumitomo Seika Chemicals Company Limited, Japan) was strewed on the absorbent fibrous sheet at the rate of 15 g/m$^2$. Further, the same absorbent fibrous sheet was put on the strewed resin to make a laminated structure by an embossing process. Then, the laminated structure consisting of three layers; the absorbent fibrous sheet/the resin having the high water absorbency/the absorbent fibrous sheet, was produced. On the other hand, a comparative laminated structure consisting of three layers; a tissue paper/the resin having high water absorbency/a tissue paper, was prepared. Each tissue paper weighed 18 g/m$^2$. Into these two laminated structures, aqueduct water were absorbed respectively. Then, it was found that the velocity of water absorption of the laminated structure containing the absorbent fibrous sheets is larger than that of the comparative laminated structure. Moreover, when the water was fallen on the absorbent fibrous sheet of the laminated structure, the water droplet was diffused and absorbed in the absorbent fibrous sheet of the laminated structure. Subsequently, the water in the pores among fibers of the absorbent fibrous sheet was quickly absorbed into the resin having the high water absorbency, and thereby, the absorbent fibrous sheet was almost dried. Therefore, even if water is fallen on the absorbent fibrous sheet of the laminated structure again, the water can be absorbed into this sheet rapidly.

Conventional catamenial napkins, disposable diaper and the like were manufactured, for example, by way of combining fluff pulp (Its tissues are disintegrated so as to be cottony.) with the above mentioned comparative laminated structure (It consists of three layers; the tissue paper/the resin having high water absorbency/the tissue paper.). However, the fluff pulp is so highly bulky. Thus, instead of the above combination, the laminated structure containing the absorbent fibrous sheet can be used suitably. Thereby, a small and thin articles for the catamenial napkins, disposable diaper and the like can be produced.

EXAMPLE 4

A two layer sheet consisting of an absorbing layer and a heat seal layer was produced as follows.

Na-salts of fibrous CMC (manufactured by Nichirin Chemical Industries, Ltd., Japan, the degree of substitution: 0.43, the degree of base saturation: 90%) were dispersed in water in order to prepare a suspension having the concentration of 1.5%. Polyamine resin (FR-2p) was added to the suspension to be stirred at the mixing rate of 2 weight % for the Na-salts of the fibrous CMC in order to prepare the first stock. On the other hand, core-sheath type melt-adhesive bicomponent fibers (NBF-E, trade name of product manufactured by Daiwabo Co., Ltd., Japan, hereinafter, expressed by "NBF") were dispersed to be the second stock having the concentration of 1.5%. Then, the first and second stocks were mixed so as to produce the first paper-stock. The mixing ratio by weight of the first and second stocks was 80 weight % and 20 weight %. From this first paper-stock, the water absorptive layer could be obtained. In this operation, NBF was used in order to combine a heat seal-layer explained below with the water absorptive layer and increase the wet tensile strength of the water absorptive layer.

On the other hand, soft-wood bleached sulfate pulp (Hereinafter, it is expressed by "NBKP".) was beated so as to have freeness of 550 ml CSF (Canadian Standard Freeness). Next, chemicals for increasing the wet tensile strength of papers (Kymene 557H, trade name of product manufactured by Dic-Hercules Chemicals Incorporated) were added. The ratio of the added chemicals was 0.3 weight % as solid matter for the absolute dry weight of the NBKP. Then, the NBF and the NBKP were mixed at the weight ratio of 40 weight % and 60 weight % so as to produce the second paper-stock for forming the heat seal-layer.

A cylinder paper machine having two cylinders was used. Then, the above first and second paper-stocks were put on the cylinders respectively. Thus, the first wet-web produced from the first paper-stock and the second wet-web produced from the second paper-stock were combined to be the two layer sheet having the basis weight of 70 g/m$^2$. While one surface of the two layer sheet has the water absorbency, the other surface has the ability of heat seal. The water absorptive layer had the basis weight of 50 g/m$^2$ and the heat seal-layer had the basis weight of 20 g/m$^2$.

As for the resultant absorbent two layer sheet, the water absorption degree, the wet tensile strength, the slime degree in wetting were evaluated respectively. Then, the result is shown in Table 1.

As shown in Table 1, the laminated structure having the layer consisting of the absorbent fibrous structure according to the present invention could absorb aqueduct water being 8 times as heavy as itself. Even after absorbing water, the structure had high wet tensile strength so as to keep its sheet-structure. The fibrous CMC in the sheet absorbing water had high gel strength. Accordingly, the slime was not generated at all. The pH value of the sheet-surface was 6 to 7; neutral.

Next, heat sealing is carried out at the temperature of 160° C. and the pressure of 2 kg/cm$^2$ (0.196 MPa) for 2 seconds so that two portions of the heat seal-surface of the two layer sheet were sticked together. Thus, the resultant test piece, which was produced by this heat sealing and which was 15 mm in width, was prepared. Its heat seal strength measured with a T-shaped adhesion tester was 500 g/15 mm (327 N/m). This is enough strength in utility.

From Example 4, it is clear that by using the absorbent fibrous structure, a combination sheet comprising two layers, that is a heat seal layer and a water absorptive layer, can be obtained. Thereby, the absorbent fibrous structure of the present invention can be easily combined to other materials such as synthetic resin film. Alternatively, using the absorbent fibrous structure together with the other materials, bag-making can be performed easily.

EXAMPLE 5

Na-salts of fibrous CMC (manufactured by Nichirin Chemical Industries, Ltd., Japan, the degree of substitution: 0.35, the degree of base saturation: 95%) were dispersed in water in order to prepare a suspension having the concentration of 1.5%. Polyamine resin (FR-2P) was added to the suspension and stirred at the mixing rate of 3.0 weight % for the Na-salts of the fibrous CMC in order to prepare a molding-stock.

A convex mold for molding a tray having the length of 20 cm, the width of 20 cm and the height of 10 cm was prepared. The portion of the mold being contacted with the side surfaces and the bottom of the tray were made of porous metal plates provided with wire nettings (150 mesh). A suction pump was equipped to the mold for reducing the inner pressure of the mold. First, the mold was immersed in the above mentioned molding-stock. Next, the inner pressure of the mold was reduced so that fibrous material could be accumulated on the surfaces of the wire nettings to be 2 to 3 mm thick. Then, press-dehydration and drying were carried out. Finally, a molded article was removed from the convex mold.

As for the resultant molded article, the water absorption degree and the slime degree in wetting were evaluated respectively. This article could absorb aqueduct water being 10 times as heavy as itself. Even after absorbing water, the molded article had high wet tensile strength so as to keep its molding-structure. The fibrous CMC in the molded article absorbing water had a high gel strength and flexibility, thus, the molded article had also flexibility. Accordingly, the slime was not generated at all. The pH value of the molded article-surface was 6 to 7.

EXAMPLE 6

Na-salts of fibrous CMC (manufactured by Nichirin Chemical Industries, Ltd., Japan, the degree of substitution: 0.43, the degree of base saturation: 95%) were dispersed in water in order to prepare a suspension having the concentration of 1.0%. Cationic poly(acrylamide) resin (AG Fix M15, trade name of product manufactured by Meisei Chemical Works, Ltd., Japan, having quaternary nitrogen atoms, ca.: 4.5 milli equivalents/g) was added to the above suspension to be stirred at the mixing rate of 2.0 weight % and 4.0 weight % respectively for the Na-salts of the fibrous CMC, so that two stocks could be prepared. Then, two kinds of hand-made sheet having the basis weight of 60 g/m$^2$ were produced from the stocks according to JIS P8209.

As for the resultant absorbent fibrous hand-made sheet, the water absorption degree, the wet tensile strength, the slime degree in wetting were evaluated respectively. Then, the results for the two kinds of hand-made sheet are shown in Table 2. On the other hand, for a cellulose type dry-laid non-woven fabric having the basis weight of 68 g/m², the same conditions were evaluated. Then, also the result for the fabric is shown in Table 2 in order to compare this hand-made sheet with the fabric.

As shown in Table 2, the sheet according to the present invention and obtained in Example 6 could absorb aqueduct water being 10 to 11 times as heavy as itself. Even after absorbing water, the sheet had high wet tensile strength of 90 to 120 g/15 mm (59 to 78 N/m) so as to keep its sheet-structure. The fibrous CMC in the sheet absorbing water had high gel strength and flexibility. Accordingly, the slime was not generated at all. The pH value of the sheet-surface was 6 to 7; it was neutral.

EXAMPLE 7

Na-salts of fibrous CMC (manufactured by Nichirin Chemical Industries, Ltd., Japan, the degree of substitution: 0.43, the degree of base saturation: 95%) were dispersed in water in order to prepare a suspension having the concentration of 1.0%. Chitosan solution (manufactured by Katakura Chikkarin Co., Ltd., Japan, having primary and secondary nitrogen atoms, ca.: 4.2 milli equivalents/g, produced by dissolving of chitosan in the aqueous solution of lactic acid so as to have the concentration of 2.5%) was added to the above suspension to be stirred at the mixing rate of 2.5 weight % and 10.0 weight % respectively for the Na-salts of the fibrous CMC, so that two stocks could be prepared. Then, two kinds of hand-made sheet having the basis weight of 60 g/m² were produced from the stocks according to JIS P8209.

As for the resultant absorbent fibrous hand-made sheet, the water absorption degree, the wet tensile strength, the slime degree in wetting were evaluated respectively in the same way as Example 6. Then, the results for the two kinds of hand-made sheet are shown in Table 2.

As shown in Table 2, the sheet obtained in Example 7 could absorb aqueduct water being 7 to 9 times as heavy as itself. Even after absorbing water, the sheet had high wet tensile strength of 210 to 450 g/15 mm (137 to 294 N/m) so as to keep its sheet-structure. The fibrous CMC in the sheet absorbing water had high gel strength. Accordingly, the slime was not generated at all like that of Example 6. The pH value of the sheet-surface was 6 to 7; it was neutral.

EXAMPLE 8

First, 50 weight % of methacryloyloxyethyl trimethyl ammonium chloride and 50 weight % of acrylamide were dissolved in water to be a solution having the concentration of 10 weight %. The solution was heated at 70° to 75° C. so that the above mentioned two compounds were polymerized, while ammonium persulfate was used as an initiator. Then, by fractional precipitation in a water-methanol system, the reaction solution was purified in order to prepare a copolymer formed from the above two compounds. The resultant copolymer had quaternary nitrogen atoms and the ca. of 3.2 milli equivalents/g on the condition of pH value of 6.

Next, Na-salts of fibrous CMC (manufactured by Nichirin Chemical Industries, Ltd., Japan, the degree of substitution: 0.43, the degree of base saturation: 95%) were dispersed in water in order to prepare a suspension having the concentration of 1.0%. The copolymer prepared above (4.0 weight % for the Na-salts of fibrous CMC) was dissolved in water to be a solution having the concentration of 1%. This solution of the copolymer was added to the suspension of the Na-salts of fibrous CMC to be stirred in order to prepare a stock. Then, from this stock, a hand-made sheet having the basis weight of 60 g/m² was produced according to JIS P8209.

As for the resultant absorbent fibrous hand-made sheet, the water absorption degree, the wet tensile strength, the slime degree in wetting were evaluated respectively. As a result, as shown in Table 2, the sheet obtained in Example 8 could absorb aqueduct water being 10 times as heavy as itself. Even after absorbing water, the sheet had high wet tensile strength of 100 g/15 mm (65 N/m) so as to keep its sheet-structure. The fibrous CMC in the sheet absorbing water had high gel strength, and the slime was not generated at all. The pH value of the sheet-surface was 6 to 7; it was neutral.

EXAMPLE 9

Dimethylamine was cooled to −20° C. so as to be liquefied. 92 g of epichlorohydrin (1 mole) kept at 15° C. was dropped into 45 g of the liquefied-dimethylamine (66 ml, 1 mole) in the course of 2 hours so that a mixture could be prepared. After the mixture was left for 4 hours at 15° C., 20 ml of pure water was added to the mixture. Then, the solution of this mixture was heated at 70° C. for 24 hours in order to prepare polymers produced by polyaddition of secondary amine and epichlorohydrin. In order to obtain this polymer in a solid form, the above reaction solution was poured in acetone to form a precipitate, and the precipitate was dried. The ca. of the polymer was 6.2 milli equivalents/g on the condition of pH value of 6. The mean molecular weight of this polymer was 8900 (converted value with styrene), which was obtained by means of a gel permeation chromatography.

Next, Na-salts of fibrous CMC (manufactured by Nichirin Chemical Industries, Ltd., Japan, the degree of substitution: 0.43; the degree of base saturation: 90%) were dispersed in water in order to prepare a suspension having the concentration of 1.0%. The solid polymer prepared above (2.0 weight % for the Na-salts of fibrous CMC) was dissolved in water to be a solution having the concentration of 1%. This solution of the solid was added to the suspension of the Na-salts of fibrous CMC to be stirred in order to prepare a stock. Then, from this stock, a hand-made sheet having the basis weight of 70 g/m² was produced according to JIS P8209.

As for the resultant absorbent fibrous hand-made sheet, the water absorption degree, the wet tensile strength, the slime degree in wetting were evaluated respectively. As a result, as shown in Table 2, the sheet obtained in Example 9 could absorb aqueduct water being 12 times as heavy as itself. Even after absorbing water, the sheet had high wet tensile strength of 110 g/15 mm (72 N/m) so as to keep its sheet-structure. The fibrous CMC in the sheet absorbing water had high gel strength and flexibility. Accordingly, the sheet also had flexibility, and the slime was not generated at all. The pH value of the sheet-surface was 6 to 7; it was neutral.

EXAMPLE 10

62 g of the aqueous solution (1 mole) containing 50 weight % of monomethylamine and 175 g of methanol are mixed so that a mixture could be obtained. 184 g of epichlorohydrin (2 moles) was dropped into the mixture with the dropping rate designed so that the reaction temperature could be kept 30° to 40° C. The resultant mixture was left at 40° C. for 12 hours. Thus, a methanol solution containing 51 weight % of bis(3-chloro-2-hydroxypropyl) methylamine being partly polymerized was produced. Then, 279 g of the above methanol solution {0.5 moles of bis(3-chloro-2-hydroxypropyl) methylamine}, 67 g of N, N, N', N'-tetramethyl-1, 2-diamino-ethane (0.6 moles) and 100 g of pure water were mixed to be left at 80° to 90° C. for 20 hours. Then, 40 g of pure water was added to this resultant liquid to be cooled. Continuously, by addition of concentrated sulfuric acid, this cooled liquid was arranged so as to have the pH value of 4. Thus, a polymer produced by polyaddition of primary amine, epichlorohydrin and ditertiary-amine was obtained. This polymer is represented by a formula (VIII):

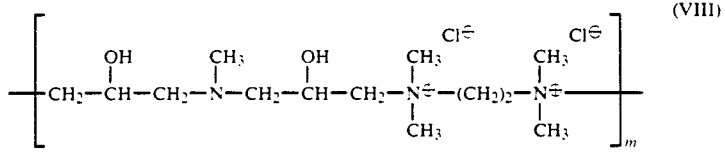

The ca. of this polymer is 4.5 milli equivalents/g on the condition of pH value of 6. The viscosity of the aqueous solution of this polymer having 25 weight % is 1200 centipoise.

Next, Na-salts of fibrous CMC (manufactured by Nichirin Chemical Industries, Ltd., Japan, the degree of substitution: 0.43, the degree of base saturation: 90%) were dispersed in water in order to prepare a suspension having the concentration of 1.0%. A polymer solution was withdrawn from the solution of the above polymer represented by the formula (VIII) so as to be 2.0 weight % as a converted value to the weight % of the solid for the Na-salts of fibrous CMC, and added to the suspension of the Na-salts of fibrous CMC to be stirred in order to prepare a stock. Then, from this stock, a hand-made sheet having the basis weight of 70 g/m² was produced according to JIS P8209.

As for the resultant absorbent fibrous hand-made sheet, the water absorption degree, the wet tensile strength, the slime degree in wetting were evaluated respectively. As a result, as shown in Table 2, the sheet obtained in Example 10 could absorb aqueduct water being 11 times as heavy as itself. Even after absorbing water, the sheet had high wet tensile strength of 90 g/15 mm (59 N/m) so as to keep its sheet-structure. The fibrous CMC in the sheet absorbing water had high gel strength and flexibility. Accordingly, the sheet also had flexibility, and the slime was not generated at all. The pH value of the sheet-surface was 6 to 7; it was neutral.

EXAMPLE 11

116 g of N, N, N', N'-tetramethylethylenediamine (1 mole), 142 g of dichloroethyl ether (1 mole) and 150 g of pure water were mixed so that a mixture could be prepared. This mixture was heated at 80° to 100° C. for 16 hours so as to prepare a solution of a polymer produced by polyaddition of dihalo compound and ditertiary-amine. The solution had the concentration of 63 weight % and was represented by formula (IX):

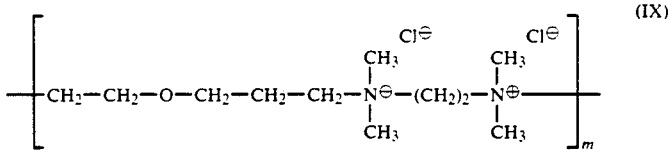

In this polymer, almost all nitrogen atoms are quaternary atoms. The ca. of this polymer is 7.0 milli equivalents/g on the condition of pH value of 6.

Next, Na-salts of fibrous CMC (manufactured by Nichirin Chemical Industries, Ltd., Japan, the degree of substitution: 0.43, the degree of base saturation: 90%) were dispersed in water in order to prepare a suspension having the concentration of 1.0%. A polymer solution was withdrawn from the solution of the above polymer represented by the formula (IX) so as to be 2.0 weight % as a converted value to the weight % of the solid for the Na-salts of fibrous CMC, and added to the suspension of the Na-salts of fibrous CMC to be stirred in order to prepare a stock. Then, from this stock, a hand-made sheet having the basis weight of 70 g/m² was produced according to JIS P8209.

As for the resultant absorbent fibrous hand-made sheet, the water absorption degree, the wet tensile strength, the slime degree in wetting were evaluated respectively. As a result, as shown in Table 2, the sheet obtained in Example 11 could absorb aqueduct water being 10 times as heavy as this sheet. Even after absorbing water, the sheet had high wet tensile strength of 150 g/15 mm (98 N/m) so as to keep its sheet-structure. The fibrous CMC in the sheet absorbing water had high gel strength and flexibility. Accordingly, the sheet also had flexibility, and the slime was not generated at all. The pH value of the sheet-surface was 6 to 7; it was neutral.

EXAMPLE 12

208 g of tetraethylenepentamine (1.1 moles) was dissolved into 50 g of pure water. Into the solution of tetraethylenepentamine, 109 g of ethylene dichloride (1.1 moles) was dropped little by little so that a mixture could be prepared. Further, 50 g of pure water was added to the mixture. The solution of the mixture was heated for 3 hours while heating condition was arranged so that reflux was performed slightly so as to produce polyethylene-polyamine hydrochloride. On the other hand, 90 g of sodium hydroxide (2.2 moles) is dissolved into 100 g of pure water. Then, for neutralization, this solution of sodium hydroxide was added into the polyethylene-polyamine hydrochloride prepared above little by little. At the same time, sodium chloride produced as byproduct was removed. Thus, the solution of polyethylene-polyamine as one kind of polyamine resin was produced. The concentration of this solution was 46 weight %.

Next, Na-salts of fibrous CMC (manufactured by Nichirin Chemical Industries, Ltd., Japan, the degree of substitution: 0.43, the degree of base saturation: 90%) were dispersed in water in order to prepare a suspension having the concentration of 1.0%. A solution was withdrawn from the solution of polyethylene-polyamine prepared above so as to be 2.0 weight % as a converted value to the weight % of the solid for the Na-salts of fibrous CMC, and added to the suspension of the Na-salts of fibrous CMC to be stirred in order to prepare a stock. Then, from this stock, a hand-made sheet having the basis weight of 70 g/m$^2$ was produced according to JIS P8209.

As for the resultant absorbent fibrous hand-made sheet, the water absorption degree, the wet tensile strength, the slime degree in wetting were evaluated respectively. As a result, as shown in Table 2, the sheet obtained in Example 12 could absorb aqueduct water being 10 times as heavy as this sheet. Even after absorbing water, the sheet had high wet tensile strength of 95 g/15 mm (62 N/m) so as to keep its sheet-structure. The fibrous CMC in the sheet absorbing water had high gel strength and flexibility. Accordingly, the sheet also had flexibility, and the slime was not generated at all. The pH value of the sheet-surface was 6 to 7; it was neutral.

EXAMPLE 13

116 g of hexamethylenediamine (1.0 mole) was dissolved into 108 g of pure water. Into this solution of hexamethylenediamine, 92 g of epichlorohydrin (1.0 mole) was dropped little by little so that a liquid could be prepared. The liquid was heated at 45° to 50° C. for 20 hours. Then, the resultant liquid was arranged so as to have the pH value of 5 by addition of acetic acid. Thus, a polycondensation polymer of diamine epichlorohydrin as one kind of polyamine resin was produced.

Next, Na-salts of fibrous CMC (manufactured by Nichirin Chemical Industries, Ltd., Japan, the degree of substitution: 0.43, the degree of base saturation: 90%) were dispersed in water in order to prepare a suspension having the concentration of 1.0%. A solution was withdrawn from the solution of polyamine resin prepared above so as to be 2.0 weight % as a converted value to the weight % of the solid for the Na-salts of fibrous CMC, and added to the suspension of the Na-salts of fibrous CMC to be stirred in order to prepare a stock. Then, from this stock, a hand-made sheet having the basis weight of 70 g/m$^2$ was produced according to JIS P8209.

As for the resultant absorbent fibrous hand-made sheet, the water absorption degree, the wet tensile strength, the slime degree in wetting were evaluated respectively. As a result, as shown in Table 2, the sheet obtained in Example 13 could absorb aqueduct water being 10 times as heavy as itself. Even after absorbing water, the sheet had high wet tensile strength of 90 g/15 mm (59 N/m) so as to keep its sheet-structure. The fibrous CMC in the sheet absorbing water had high gel strength and flexibility. Accordingly, the sheet also had flexibility and the slime was not generated at all. The pH value of the sheet-surface was 6 to 7; it was neutral.

TABLE 1

| Sample | Water Absorption Degree(g/g) | Wet Tensile Strength (N/m) | | Slime degree in Wetting |
|---|---|---|---|---|
| | | Machine Direct. | Cross machine Direct. | |
| The Present Invention | | | | |
| Example 1 | 12 | 131 | 26 | A |
| Example 2 | 13 | 72 | 72 | B |
| Example 3 | 10 | 118 | 26 | A |
| Example 4 | 8 | 392 | 209 | A |
| The compared Sample | | | | |
| Tissue paper | 5 | 0 | 0 | A |

In Table 1
A: slime is not generated at all
B: slime is generated a little.
Note:
In Example 2, the wet tensile strength on the machine direction was the same as that of the cross direction. Because the sample was hand-made sheet and had isotropic character.

TABLE 2

| Sample | Amount of Cationic polymer(wt %) | Water Absorption Degree(g/g) | Wet Tensile Strength (N/m) | Slime degree in Wetting |
|---|---|---|---|---|
| The Present Invention | | | | |
| Example 6 | 2.0 | 11 | 59 | No |
| Example 6 | 4.0 | 10 | 78 | |
| Example 7 | 2.5 | 9 | 137 | No |
| Example 7 | 10.0 | 7 | 294 | |
| Example 8 | 4.0 | 10 | 65 | No |
| Example 9 | 2.0 | 12 | 72 | No |
| Example 10 | 2.0 | 11 | 59 | No |
| Example 11 | 2.0 | 10 | 98 | No |
| Example 12 | 2.0 | 10 | 62 | No |
| Example 13 | 2.0 | 10 | 59 | No |
| The compared Sample | | | | |
| Dry-laid Non-woven Rayon Fabric | — | 3 | 105 | No |

What is claimed is:

1. An absorbent fibrous structure comprising salts of fibrous carboxymethyl cellulose, wherein:

polyelectrolyte complexes are formed in at least a part of said salts of fibrous carboxymethyl cellulose by cationic water-soluble polymers, each of which comprises repeating units having at least one of primary, secondary, tertiary and quaternary nitrogen atoms and each of which does not substantially have functional groups for forming cross-linking other than said nitrogen atoms, and said absorbent fibrous structure is formed as a shaped structure having water absorbency and wet-web strength.

2. An absorbent fibrous structure according to claim 1, wherein said cationic water-soluble polymer is at least one selected from chitosan, a polymer having at least one of primary, secondary, tertiary and quaternary nitrogen atoms on the side chains of said polymer and a polymer having at least one of primary, secondary, tertiary and quaternary nitrogen atoms on the principal chains of said polymer.

3. An absorbent fibrous structure according to claim 2, wherein said polymer having at least one of primary, secondary, tertiary and quaternary nitrogen atoms on said principal chains of said polymer is a polymer selected from ionene polymer, poly(ethyleneimine), polyamine resin and polyamine-polyamide.

4. The absorbent fibrous structure according to claim 1 wherein said shaped structure is a sheet or laminate.

5. The absorbent fibrous structure according to claim 1 wherein said shaped structure is a molded structure.

6. An absorbent fibrous structure according to claim 1, wherein said at least one of primary, secondary, tertiary and quaternary nitrogen atoms is at least one group selected from amino group, N-alkylamino group, N,N-dialkylamino group, N,N,N-trialkylammonium group, N,N,-dialkyl-N-acetoxyalkylammonium group, N-alkanolamino group, N,N-dialkanolamino group, N,N,N-trialkanolammonium group, N,N-dialkanol-N-acetoxyalkylammonium group, N,N-dialkyl-N-methyleneammonioalkylene group, N,N-dialkyl-N-methyleneammonioarylenealkylene group, N,N-dialkanol-N-methyleneammonioalkylene group, N,N-dialkyl-N-hydroxymethyleneammonioalkylene group, N,N-dialkanol-N-hydroxymethyleneammonioalkylene group, N,N-dialkanol-N-methyleneammonioarylenealkylene group, N,N-dialkyl-N-hydroxymethyleneammonioarylenealkylene group, N,N-dialkanol-N-hydroxymethyleneammonioarylenealkylene group, N,N-diaralkyl-N-methyleneammoniomethylene group, nitrilo group, imino group, N-alkyl-N-methyleneiminiomethylene group, N-alkanol-N-methyleneiminionlethylene group, N-alkyleneaminoalkylene group, N-hydroxyalkyleneaminoalkylene group, N-hydroxyalkyleneaminohydroxyalkylene group, N-alkylene-N-alkylcarbamoyl group, N,N-dialkylenecarbamoyl group, N,N-dialkylene-N-alkylcarbamoyl group, N,N,N-trialkylenecarbanoyl group and N-acetylamino group.

7. A producing method of an absorbent fibrous structure comprising:

adding cationic water-soluble polymers, each of which comprises repeating units having at least one of primary, secondary, tertiary and quaternary nitrogen atoms and each of which does not substantially have functional groups for forming cross-linking other than said nitrogen atoms, to a suspension of salts of fibrous carboxymethyl cellulose in order to prepare a stock, in which polyelectrolyte complexes are formed in at least a part of said salts of fibrous carboxymethyl cellulose; and dehydrating said stock to form a shaped structure having water absorbency and wet-web strength.

8. A producing method of an absorbent fibrous structure according to claim 7, wherein said cationic water-soluble polymer is at least one selected from chitosan, a polymer having at least one of primary, secondary, tertiary and quaternary nitrogen atoms on the side chains of said polymer and a polymer having at least one of primary, secondary, tertiary and quaternary nitrogen atoms on the principal chains of said polymer.

9. A producing method of an absorbent fibrous structure according to claim 8, wherein said polymer having at least one of primary, secondary, tertiary and quaternary nitrogen atoms on said principal chains of said polymer is a polymer selected from ionene polymer, poly(ethyleneimine), polyamine resin and polyamine-polyamide.

10. A producing method of an absorbent fibrous structure according to claim 7, wherein said at least one of primary, secondary, tertiary and quaternary nitrogen atoms is at least one group selected from amino group, N-alkylamino group, N,N-dialkylamino group, N,N,N-trialkylammonium group, N,N,-dialkyl-N-ace toxyalkylammonium group, N-alkanolamino group, N,N-dialkanolamino group, N,N,N-trialkanolammonium group, N,N-dialkanol-N-acetoxyalkylammonium group, N,N-dialkyl-N-methyleneammonioalkylene group, N,N-dialkyl-N-methyleneammonioarylenealkylene group, N,N-dialkanol-N-methyleneammonioalkylene group, N,N-dialkyl-N-hydroxymethyleneammonioalkylene group, N,N-dialkanol-N-hydroxymethyleneammonioalkylene group, N,N-dialkanol-N-methyleneammonioarylenealkylene group, N,N-dialkyl-N-hydroxymethyleneammonioarylenealkylene group, N,N-dialkanol-N-hydroxymethyleneammonioarylenealkylene group, N,N-diaralkyl-N-methylenearnoniomethylene group, nitrilo group, imino group, N-alkyl-N-methyleneiminiomethylene group, N-alkanol-N-methyleneiminiomethylene group, N-alkyleneaminoalkylene group, N-hydroxyalkyleneaminoalkylene group, N-hydroxyalkyleneaminohydroxyalkylene group, N-alkylene-N-alkylcarbamoyl group, N,N-dialkylenecarbamoyl group, N,N-dialkylene-N-alkylcarbamoyl group, N,N,N-trialkylenecarbamoyl group and N-acetylamino group.

* * * * *